US011933633B2

(12) United States Patent
Yamamoto et al.

(10) Patent No.: US 11,933,633 B2
(45) Date of Patent: Mar. 19, 2024

(54) POINT CLOUD DATA ACQUIRING METHOD AND POINT CLOUD DATA ACQUIRING SYSTEM

(71) Applicant: Aichi Steel Corporation, Tokai (JP)

(72) Inventors: Michiharu Yamamoto, Tokai (JP); Hitoshi Aoyama, Tokai (JP)

(73) Assignee: AICHI STEEL CORPORATION, Tokai (JP)

( * ) Notice: Subject to any disclaimer, the term of this patent is extended or adjusted under 35 U.S.C. 154(b) by 90 days.

(21) Appl. No.: 17/431,710

(22) PCT Filed: Feb. 25, 2020

(86) PCT No.: PCT/JP2020/007360
§ 371 (c)(1),
(2) Date: Aug. 18, 2021

(87) PCT Pub. No.: WO2020/175438
PCT Pub. Date: Sep. 3, 2020

(65) Prior Publication Data
US 2022/0011102 A1 Jan. 13, 2022

(30) Foreign Application Priority Data

Feb. 27, 2019 (JP) .................. 2019-034970

(51) Int. Cl.
G01C 7/04 (2006.01)
G08G 1/042 (2006.01)
(52) U.S. Cl.
CPC ............. G01C 7/04 (2013.01); G08G 1/042 (2013.01)

(58) Field of Classification Search
CPC ...... G01C 7/04; G01C 21/30; G01C 21/3815; G01C 21/3848; G01C 21/165; G08G 1/042
See application file for complete search history.

(56) References Cited

U.S. PATENT DOCUMENTS 9,080,866 B1 * 7/2015 Dowdall .................. G01C 3/08
2010/0020074 A1 1/2010 Taborowski et al.
(Continued)

FOREIGN PATENT DOCUMENTS

EP 3467806 A1 4/2019
JP 2002-260163 A 9/2002
(Continued)

OTHER PUBLICATIONS

International Search Report and Written Opinion dated Apr. 21, 2020, received for PCT Application PCT/JP2020/007360, Filed on Feb. 25, 2020, 8 pages including English Translation.

Primary Examiner — Thomas E Worden
Assistant Examiner — Daniel Tyler Reich
(74) Attorney, Agent, or Firm — XSENSUS LLP

(57) ABSTRACT

A point cloud data acquiring system (1) is a system which acquires, as moving, point cloud data which serves as base data for a three-dimensional map representing a traveling environment of a vehicle includes range finding part (31) which acquires point cloud data representing azimuths and distances to planimetric features configuring the traveling environment, marker detecting part (2) which detects marker (10) laid in or on a traveling road of the vehicle, and a data recording part which records point cloud data acquired by range finding part (31) as linking thereto marker reference information including positional information with reference to any marker (10).

16 Claims, 16 Drawing Sheets

(56) References Cited

U.S. PATENT DOCUMENTS

| | | | |
|---|---|---|---|
| 2018/0257688 A1* | 9/2018 | Carter | G08B 13/1436 |
| 2018/0283882 A1* | 10/2018 | He | G01C 21/3407 |
| 2019/0145781 A1* | 5/2019 | Iwai | G06V 20/582 |
| | | | 702/150 |

FOREIGN PATENT DOCUMENTS

| | | |
|---|---|---|
| JP | 2010-510559 A | 4/2010 |
| JP | 2017-156704 A | 9/2017 |
| JP | 2018-128364 A | 8/2018 |
| JP | 2018-169301 A | 11/2018 |
| WO | 2017/208503 A1 | 12/2017 |

* cited by examiner

POINT CLOUD DATA ACQUIRING METHOD AND POINT CLOUD DATA ACQUIRING SYSTEM

CROSS-REFERENCE TO RELATED APPLICATIONS

The present application is based on PCT filing PCT/JP2020/007360, filed Feb. 25, 2020, which claims priority to JP 2019-034970, filed Feb. 27, 2019, the entire contents of each are incorporated herein by reference.

TECHNICAL FIELD

The present invention relates to a method and a system for acquiring point cloud data which serves as base data for a three-dimensional map representing a road.

BACKGROUND ART

In recent years, various driving assist technologies to reduce vehicle driving loads have been suggested and are being achieved. As driving assist technologies, for example, there are driving assist technologies, such as breaking control in an automatic braking function and steering control in a lane keeping function, in which part of vehicle control is carried out by a vehicle side. Furthermore, sophisticated driving assist technologies and so forth are also suggested, in which almost entire vehicle control such as steering control and speed-governing control is performed by the vehicle side to bring operation loads on a driver side close to zero to achieve automatic driving.

To achieve sophisticated driving assist technologies, it is required to grasp a front road environment with high accuracy on the vehicle side. To achieve automatic driving, social demands for high-accuracy three-dimensional maps including three-dimensional information regarding curbstones, guardrails, signs, and so forth have been increasing.

For generation of a three-dimensional map representing the road environment, point cloud data is required, which includes information about distances and azimuths to the respective points of planimetric features configuring the road environment, such as curbstones, guardrails, and signs. Thus, a Mobile Mapping System (MMS) for acquiring point cloud data has been suggested (for example, refer to Patent Literature 1). This mapping system is a system utilizing a laser scanner which measures a distance to a target subject by utilizing reflection time of laser light, a camera for taking a vehicle's peripheral image, and so forth. With a vehicle with the mobile mapping system on board, it is possible to acquire a combination of three-dimensional point cloud data and a front image as traveling on the road.

CITATION LIST

Patent Literature

Patent Literature 1: Japanese Unexamined Patent Application Publication No. 2018-128364

SUMMARY OF INVENTION

Technical Problem

If the laser scanner and the camera are positionally aligned with high accuracy, distance information can be combined with high accuracy with the front image. On the other hand, if the position and the axial direction of the laser scanner and/or the camera at the time of acquisition of point cloud data or the like are not grasped with high accuracy, there is a possibility of decreasing the accuracy of a three-dimensional map based on that point cloud data.

The present invention was made in view of the above-described conventional problem, and is to provide a method and a system for acquiring high-quality point cloud data that can serve as base data for a high-accuracy three-dimensional map.

Solution to Problem

One mode of the present invention resides in a point cloud data acquiring method of acquiring, as moving, point cloud data which serves as base data for a three-dimensional map representing a traveling environment of a vehicle, the method including:
- a range finding process of acquiring point cloud data representing azimuths and distances to planimetric features configuring the traveling environment;
- a marker detection process of detecting a marker laid in or on a traveling road of the vehicle; and
- a data recording process of recording point cloud data, wherein
- in the data recording process, point cloud data acquired in the range finding process is recorded, to which marker reference information including positional information with reference to any marker or information based on positional information is linked.

One mode of the present invention resides in a point cloud data acquiring system which acquires, as moving, point cloud data which serves as base data for a three-dimensional map representing a traveling environment of a vehicle, the system including:
- a range finding part which acquires point cloud data representing azimuths and distances to planimetric features configuring the traveling environment;
- a marker detecting part which detects a marker laid in or on a traveling road of the vehicle; and
- a data recording part which records point cloud data acquired by the range finding part, to which marker reference information including positional information with reference to any marker or information based on positional information is linked.

Advantageous Effects of Invention

According to the present invention, it is possible to record point cloud data, to which marker reference information including positional information with reference to the marker, and so forth is linked. Since the marker is laid in or on the traveling road, the possibility of fluctuations of its position is small. By utilizing marker reference information, the position where point cloud data has been acquired can be identified with high accuracy. And, based on point cloud data with its acquisition position identified with high accuracy, a high-accuracy three-dimensional map can be created.

Point cloud data to be recorded in the present invention is one to which marker reference information is linked, and is useful in creating a high-accuracy three-dimensional map.

DESCRIPTION OF EMBODIMENTS

Figure 1:
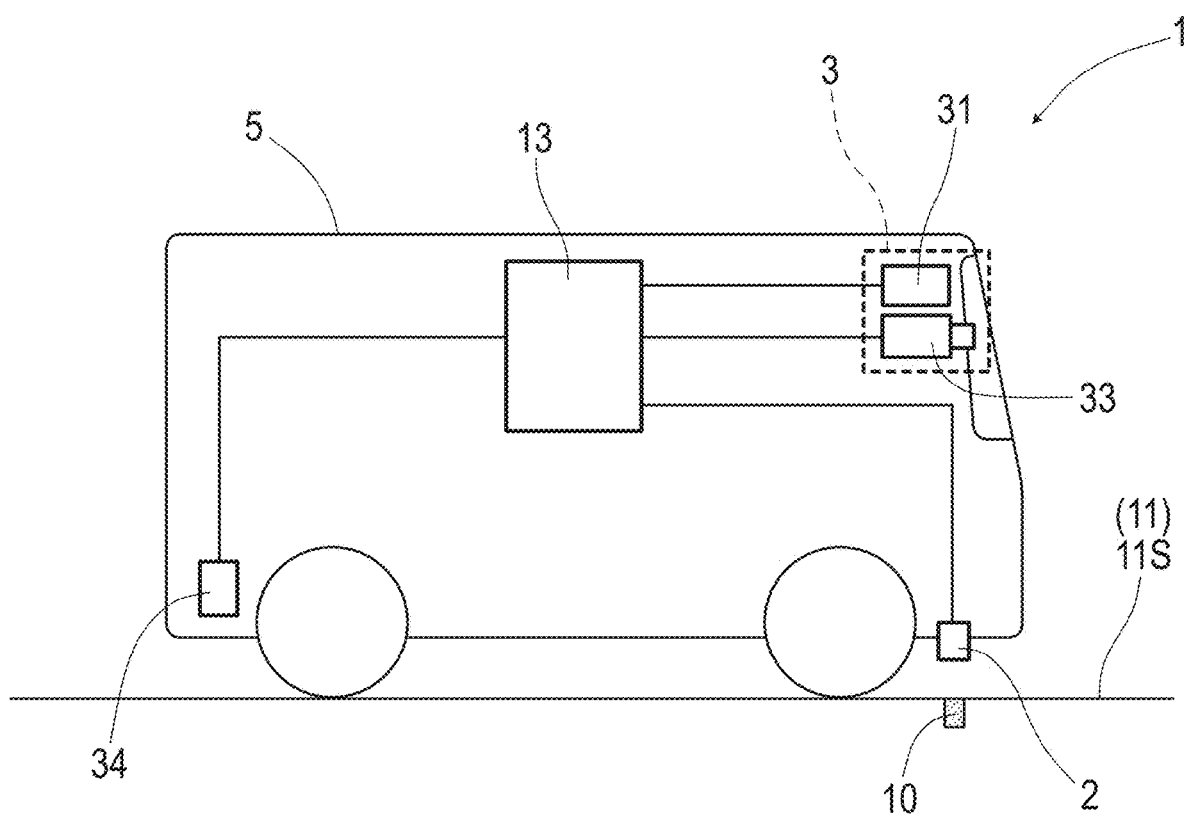
FIG. 1 is a descriptive diagram depicting a system configuration of a data collection vehicle in a first embodiment.

Modes for implementation of the present invention are specifically described by using the following embodiments.

First Embodiment

The present embodiment is an example regarding mobile mapping system 1 which acquires, as moving, point cloud data (point group data) which serves as base data for a three-dimensional map. Details of this are described with reference to FIG. 1 to FIG. 9. This mobile mapping system 1 targets at a road where markers are laid (one example of a traveling road). In the present embodiment, as one example of a marker, magnetic marker 10, which is a magnetism generation source, is adopted.

Mobile mapping system 1 (FIG. 1), which is one example of a point cloud data acquiring system, is configured to include point cloud data generation unit 3 which generates point cloud data representing azimuths and distances to planimetric features configuring a traveling environment, sensor unit 2 (one example of a marker detecting part) which detects magnetic marker 10 laid in the road, and data recording part 130 (FIG. 4) which records point cloud data.

In particular, in mobile mapping system 1, point cloud data in a state, to which marker reference information including positional information with reference to any magnetic marker 10 is linked is recorded.

First, magnetic marker 10 of the present embodiment is described. Magnetic marker 10 is, as in FIG. 1 and FIG. 2, a marker laid in road surface 11S of road (traveling road) 11. Magnetic markers 10 are arranged at a pitch of, for example, 10 meters, along the center of a lane sectioned by left and right lane marks. Magnetic marker 10 forms a columnar shape having a diameter of 20 mm and a height of 28 mm, and is laid in a state of being accommodated in a hole provided in road surface 11S.

Figure 2:
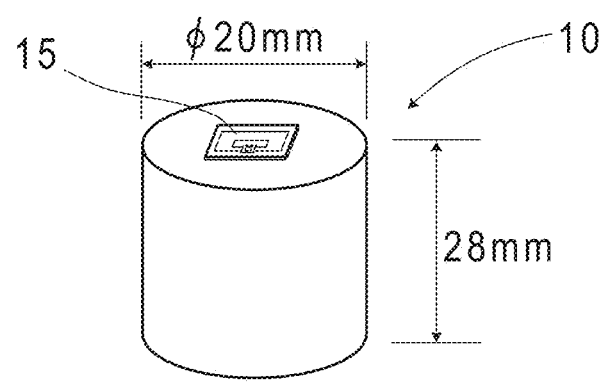
FIG. 2 is a perspective view of a magnetic marker in the first embodiment.
Figure 3:
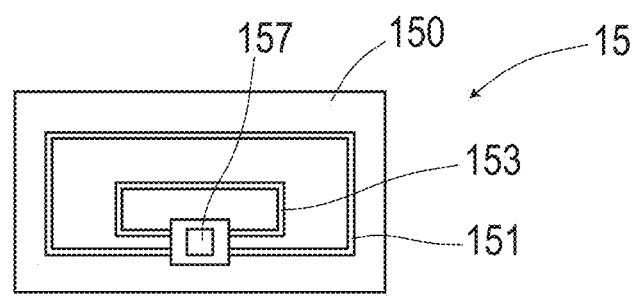
FIG. 3 is a front view of an RFID tag in the first embodiment.

As in FIG. 2 and FIG. 3, magnetic marker 10 has RFID (Radio Frequency IDentification) tag 15 attached to its upper end face as a wireless tag which wirelessly outputs information. RFID tag 15, which is one example of an information providing part, operates by wireless external power supply, and transmits a tag ID (identification information), which is one example of unique information of magnetic marker 10.

Note that a magnet adopted for magnetic marker 10 of the present embodiment is a magnet with magnetic powder of iron oxide dispersed in a polymer material. This magnet has low conductivity and eddy currents and so forth do not tend to occur at the time of wireless power supply. For this reason, RFID tag 15 annexed to magnetic marker 10 can efficiently receive wirelessly-transmitted power.

RFID tag 15 forming one example of the information providing part is an electronic component having IC chip 157 implemented on the surface of tag sheet 150 (FIG. 3) cut out from, for example, a PET (PolyEthylene terephthalate) film. On the surface of tag sheet 150, a printed pattern of loop coil 151 and antenna 153 is provided. Loop coil 151 is a receiving coil where an exciting current is generated by external electromagnetic induction. Antenna 153 is a transmission antenna for wirelessly transmitting position data and so forth.

Next, data collection vehicle 5 (FIG. 1) configures mobile mapping system 1 which records point cloud data as traveling on road 11 by operator's driving. Data collection vehicle 5 includes control unit 13; point cloud data generation unit 3; sensor unit 2, which is one example of the marker detecting part; tag reader 34, which is one example of an information reading part, and so forth.

Figure 4:
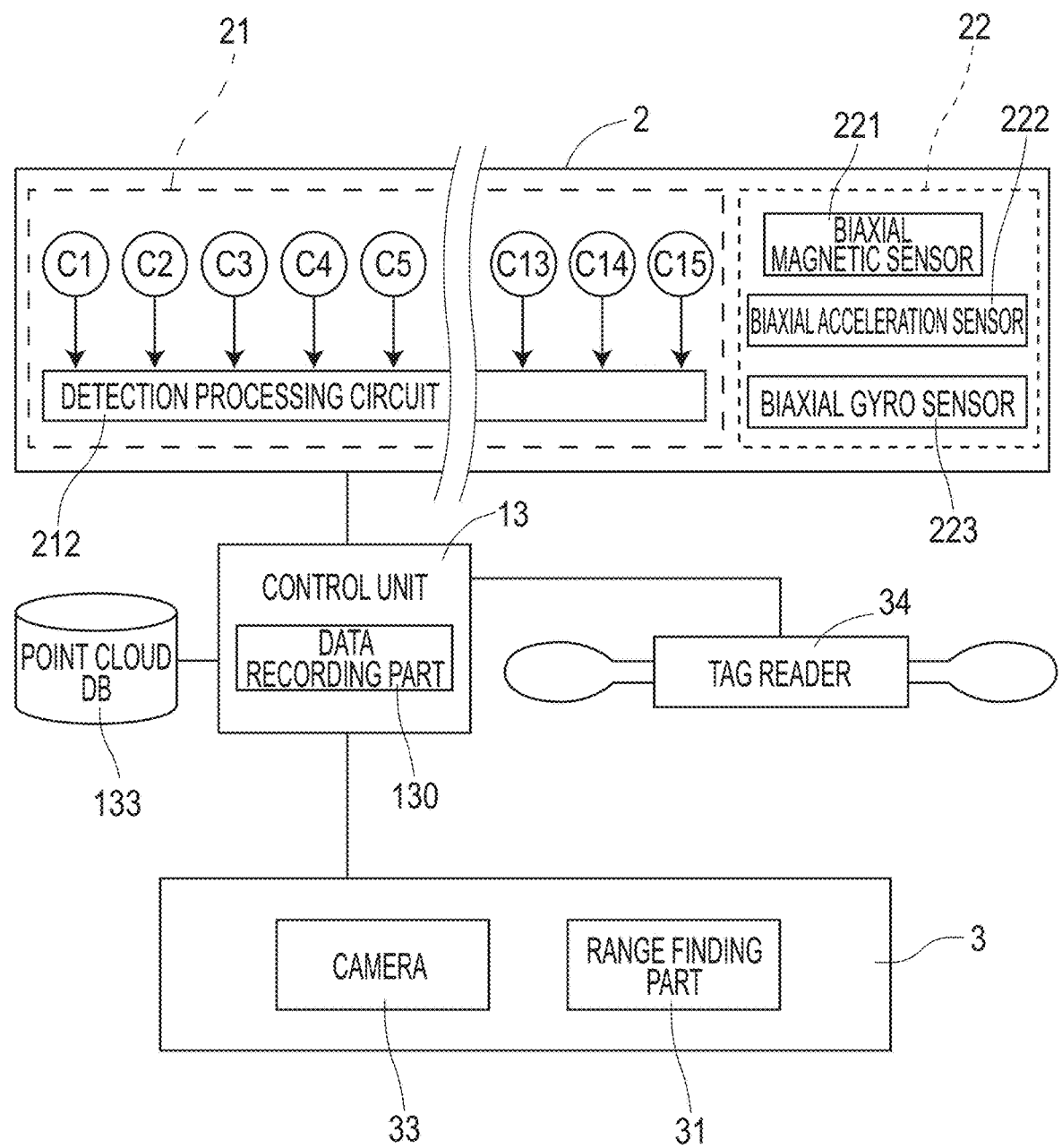
FIG. 4 is a block diagram depicting an electrical configuration of the data collection vehicle in the first embodiment.
Figure 5:
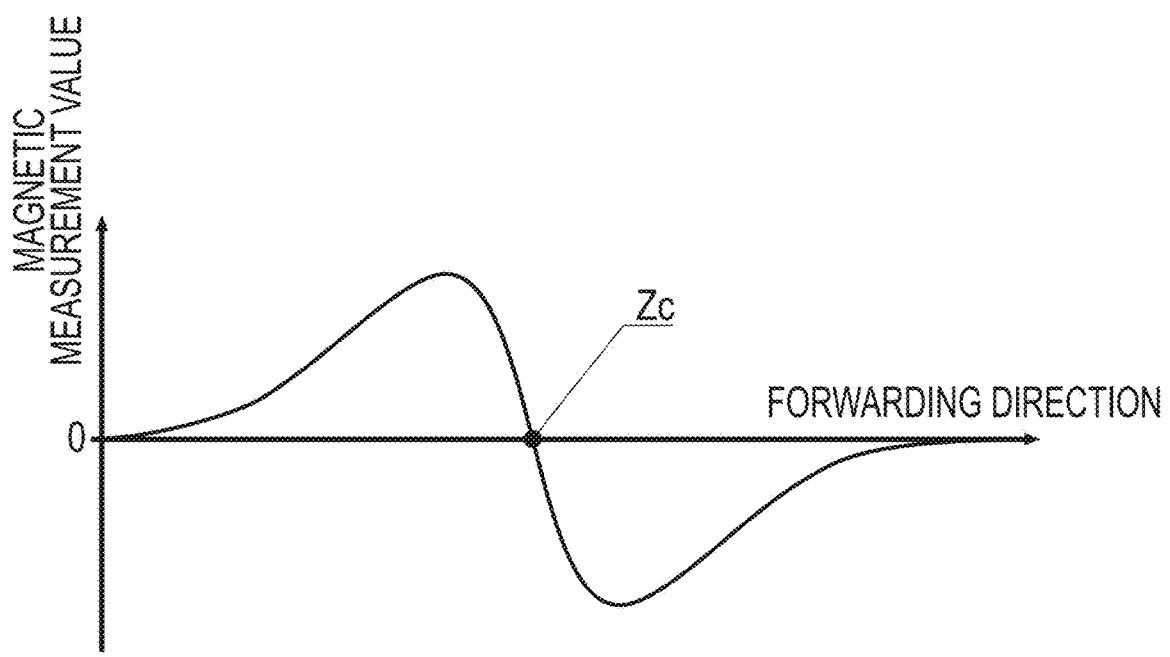
FIG. 5 is a descriptive diagram exemplarily depicting changes of a magnetic measurement value in a forwarding direction at the time of passing over the magnetic marker in the first embodiment.

Sensor unit 2 is, as in FIG. 1 and FIG. 4, a unit with sensor array 21 and IMU (Inertial Measurement Unit) 22 integrated together. Sensor unit 2 exhibits, for example, a rod shape elongated in a vehicle-width direction. This sensor unit 2 is attached, for example, the inside the front bumper in a state of facing road surface 11S. In the case of data collection vehicle 5 of the present embodiment, the attachment height of sensor unit 2 with reference to road surface 11S is 200 mm.

Sensor array 21 includes fifteen magnetic sensors Cn (n is an integer of 1 to 15) arrayed on a straight line along the vehicle-width direction and detection processing circuit 212 having a CPU and so forth, not depicted, incorporated therein (refer to FIG. 4). Note that in sensor array 21, fifteen magnetic sensors Cn are arranged equidistantly at 10 centimeters.

Magnetic sensors Cn are sensors which detect magnetism by utilizing the known MI effect (Magnet Impedance Effect) in which the impedance of a magneto-sensitive body such as an amorphous wire sensitively changes in response to the external magnetic field. In magnetic sensors Cn, magneto-sensitive bodies, not depicted, such as amorphous wires are arranged along directions of two orthogonal axes. This allows magnetic sensors Cn to detect magnetism acting in the directions of two orthogonal axes. In the present embodiment, magnetic sensors Cn are incorporated in sensor array 21 so as to be able to detect magnetic components in a forwarding direction and the vehicle-width direction.

Detection processing circuit 212 of sensor array 21 is an arithmetic circuit which performs marker detection process and so forth for detecting magnetic marker 10. This detection processing circuit 212 is configured by utilizing a CPU (central processing unit) which performs various calculations, memory elements such as a ROM (read only memory) and a RAM (random access memory), and so forth.

Detection processing circuit 212 acquires a sensor signal outputted from each magnetic sensor Cn at a frequency of, for example, 3 kHz, to perform marker detection process. Performing magnetic measurement by magnetic sensors Cn at the frequency of, for example, 3 kHz, can support generation and recording of point cloud data during traveling. Detection processing circuit 212 inputs the detection result of the marker detection process to control unit 13. In the marker detection process, in addition to detection of magnetic marker 10, measurement of a lateral shift amount of data collection vehicle 5 with respect to magnetic markers 10 is performed. Detection processing circuit 212 measures the lateral shift amount (one example of relative position information) by, for example, identifying the position of a peak value in the vehicle-width direction in a distribution of magnetic measurement values by magnetic sensors Cn arrayed in the vehicle-width direction.

IMU 22 (FIG. 4) incorporated in sensor unit 2 is an inertial navigation unit which performs process of estimating a motion of data collection vehicle 5 by inertial navigation. IMU 22 includes biaxial magnetic sensor 221 as an electronic compass which measures an azimuth, biaxial acceleration sensor 222 which measures acceleration, and biaxial gyro sensor 223 which measures angular velocity. IMU 22 estimates the motion (movement) by utilizing measurement values such as acceleration, angular velocity, and azimuth, and estimates a relative position after movement (after motion) by taking a specific position where data collection vehicle 5 was previously located as a starting point (reference).

IMU 22 calculates a momentary displacement amount by double integration of acceleration, and also calculates, with high accuracy, a momentary azimuth of data collection vehicle 5 by utilizing an azimuth change amount, which is an integration of angular velocity, measured azimuth, and so forth. And, by accumulating displacement amounts along the azimuth of data collection vehicle 5, IMU 22 calculates the relative position with reference to the reference position. By utilizing the relative position estimated by IMU 22, it is possible to estimate the own vehicle position also when data collection vehicle 5 is positioned midway between adjacent magnetic markers 10.

Tag reader 34 (FIG. 4) is a communication unit which wirelessly communicates with RFID tag 15 affixed to magnetic marker 10. While sensor unit 2 is arranged at a front part of a vehicle body, tag reader 34 is arranged at a rear part of the vehicle body (FIG. 1). By utilizing this positional relation between sensor unit 2 and tag reader 34, it is possible to predict timing when magnetic marker 10 detected by sensor unit 2 becomes close to tag reader 34. Tag reader 34 predicts this timing to wirelessly transmit electric power required for operation of RFID tag 15, and receives the tag ID transmitted from RFID tag 15.

Point cloud data generation unit 3 is a unit including range finding part 31 which acquires a distance image and camera 33 which takes a front image.

Range finding part 31 includes a light source which emits laser light, a light-receiving part which receives reflected light, a time measuring part which measures elapsed time (reflection time) from light emission to light reception, and a distance calculating part which calculates a distance from the reflection time. Furthermore, range finding part 31 includes an optical mechanism part which scans light-emitting directions of laser light in longitudinal and lateral directions. The optical mechanism part physically changes the light-emitting direction of laser light by, for example, causing high-speed rotation of a polygon mirror (polygonal mirror) which reflects laser light for projecting ahead. Range finding part 31 including this optical mechanism part acquires the distance image with distance data linked to each point in a front two-dimensional range finding area (range finding process). Note that the center axis of range finding part 31, that is, the axis penetrating through the center of the distance image, matches the longitudinal direction of data collection vehicle 5.

According to range finding part 31, distances to each point of planimetric features such as road shoulders, guardrails, signs, and traffic signals configuring the traveling environment can be identified. Furthermore, a coordinate position in the distance image represents an azimuth. That is, the distance image acquired by point cloud data generation unit 3 serves as point cloud data representing azimuths and distances to the planimetric features configuring the traveling environment.

Camera 33 is a unit for taking a front image and acquiring two-dimensional image data. Camera 33 is set so that an optical axis (center axis) matches the azimuth of data collection vehicle 5 in the longitudinal direction. Note that in data collection vehicle 5, the scanning range of laser light (range finding part 31), the angle of view of camera 33, and so forth are adjusted so that the range finding area of range finding part 31 and an image-taking area by camera 33 match.

Control unit 13 (FIG. 4) is a unit which has, in addition to a function of controlling sensor unit 2, tag reader 34, and point cloud data generation unit 3, a function as data recording part 130 which records point cloud data. Control unit 13 includes an electronic substrate (not depicted) having a CPU which performs various calculations, memory elements such as a ROM and a RAM, and so forth implemented thereon. To control unit 13, a storage device such as a hard disk drive is connected. In a storage area of the storage device, point cloud database (point cloud DB) 133 is provided. Point cloud data is recorded on this point cloud DB 133.

Next, a flow of operation of mobile mapping system 1 of the present embodiment is described. In the following, flows of (1) marker detection process, (2) marker reference data generation process, (3) point cloud data generation process, and (4) data recording process are described in this order.

(1) Marker Detection Process

While data collection vehicle 5 is traveling on road 11, sensor unit 2 (sensor array 21) repeatedly performs marker detection process for detecting magnetic marker 10.

As described above, magnetic sensors Cn can measure magnetic components in the forwarding direction and in the vehicle-width direction of data collection vehicle 5. For example, when these magnetic sensors Cn move in the forwarding direction to pass directly above any magnetic marker 10, the magnetic measurement value in the forwarding direction has its sign reversed before and after magnetic marker 10 as in FIG. 5 and changes so as to cross zero at a position directly above magnetic marker 10. Therefore, during traveling of data collection vehicle 5, when zero-cross Zc occurs in which the sign of the magnetic measurement value in the forwarding direction detected by any magnetic sensor Cn is reversed, it can be determined that sensor unit 2 is positioned directly above magnetic marker 10. Detection processing circuit 212 (FIG. 4) determines that magnetic marker 10 is detected when sensor unit 2 is positioned directly above magnetic marker 10 and zero-cross Zc of the magnetic measurement value in the forwarding direction occurs as described above.

Also, for example, as for a magnetic sensor with the same specification as that of magnetic sensors Cn, when a movement along a virtual line in the vehicle-width direction passing directly above magnetic marker 10 is assumed, the magnetic measurement value in the vehicle-width direction has its sign reversed on both sides across magnetic marker 10 and changes so as to cross zero at a position directly above magnetic marker 10. In the case of sensor unit 2 having fifteen magnetic sensors Cn arrayed in the vehicle-width direction, as in an example of FIG. 6, the signs of the magnetic measurement value in the vehicle-width direction to be detected by magnetic sensor Cn varies depending on which side the unit is present with respect to magnetic marker 10 (FIG. 7).

Figure 6:
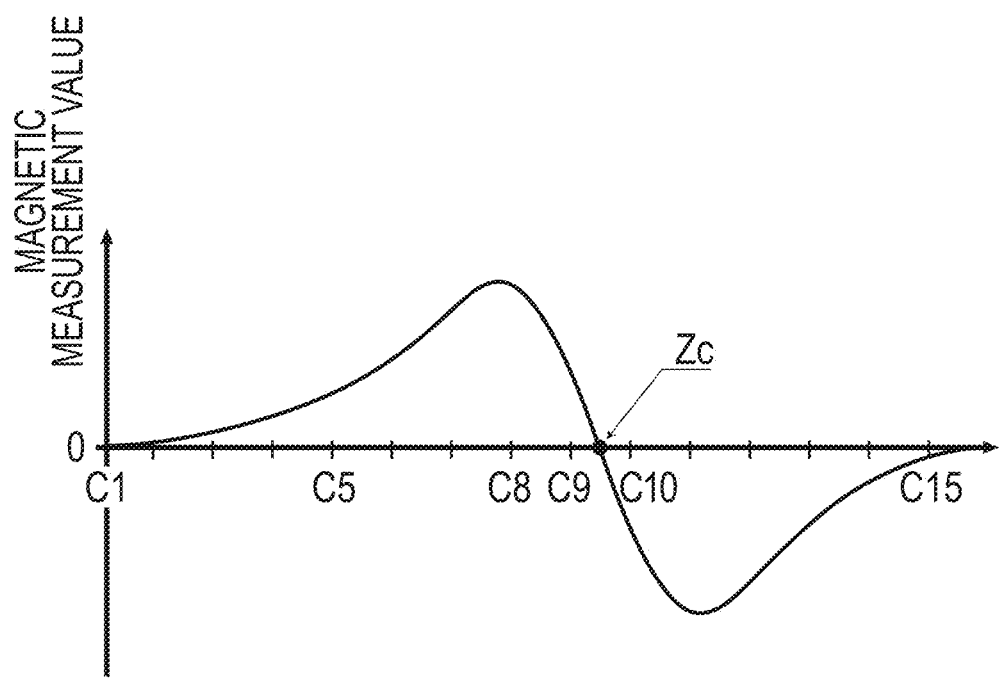
FIG. 6 is a descriptive diagram exemplarily depicting a distribution curve of the magnetic measurement value in a vehicle-width direction by magnetic sensors Cn arrayed in the vehicle-width direction in the first embodiment.
Figure 7:
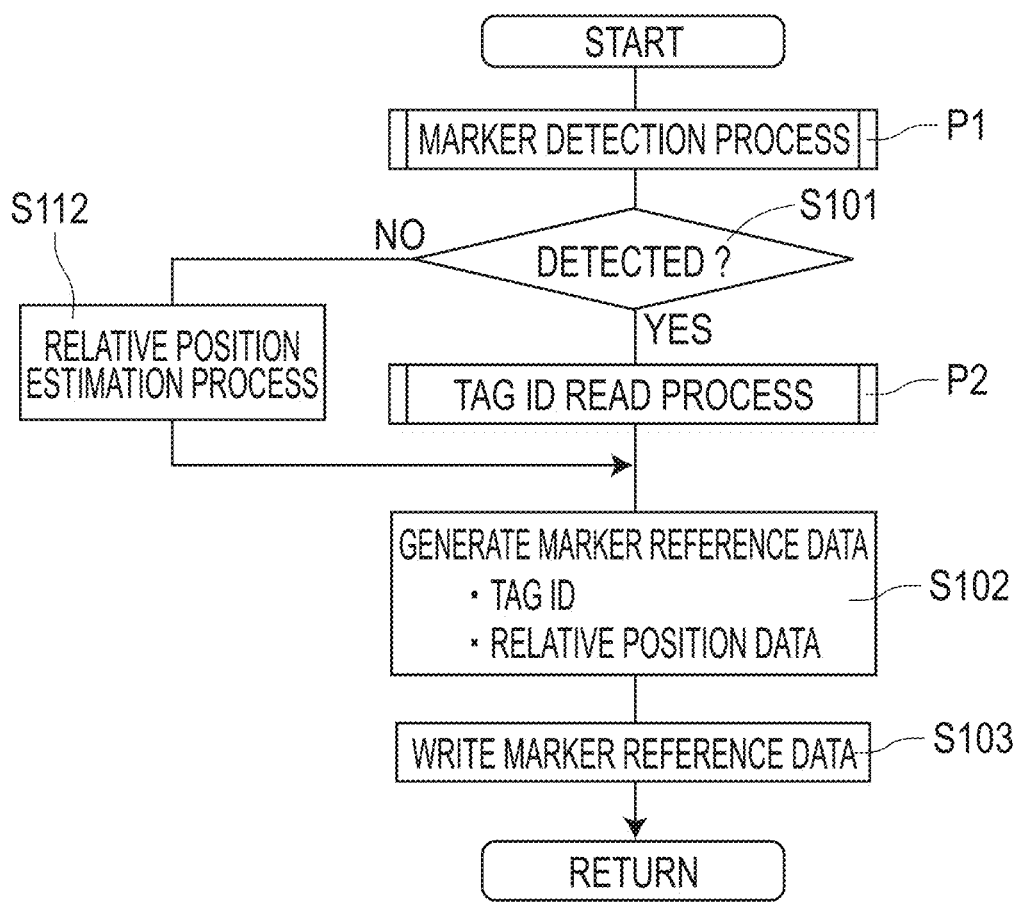
FIG. 7 is a flow diagram depicting a flow of a marker reference data generation process in the first embodiment.

Based on a distribution curve of FIG. 6 exemplarily depicting magnetic measurement values in the vehicle-width direction by each of magnetic sensors Cn of sensor unit 2, it is possible to identify the position of magnetic marker 10 in the vehicle-width direction by utilizing zero-cross Zc where the sign of the magnetic measurement value in the vehicle-width direction is reversed. When zero-cross Zc is positioned midway (not limited to the center) between adjacent two magnetic sensors Cn, a midway position between adjacent two magnetic sensors Cn across zero-cross Zc is the position of magnetic marker 10 in the vehicle-width direction. Alternatively, when zero-cross Zc matches the position of any magnetic sensor Cn, that is, when magnetic sensor Cn is present at which the magnetic measurement value in the vehicle-width direction is zero and the signs of the magnetic measurement values of magnetic sensors Cn on both outer sides are reversed, a position directly below that magnetic sensor Cn is the position of magnetic marker 10 in the vehicle-width direction.

Detection processing circuit 212 measures a deviation of the position of magnetic marker 10 in the vehicle-width direction with respect to the center position (position of magnetic sensor C8) of sensor unit 2 as a lateral shift amount of data collection vehicle 5 with respect to magnetic marker 10. For example, in the case of FIG. 6, the position of zero-cross Zc is a position corresponding to C9.5 in the neighborhood of a midpoint between C9 and C10. As described above, since the pitch between magnetic sensors C9 and C10 is 10 cm, the lateral shift amount of data collection vehicle 5 with respect to magnetic marker 10 is (9.5−8)×10=15 centimeters with reference to C8 positioned at the center of sensor unit 2 in the vehicle-width direction.

(2) Marker Reference Data Generation Process

Details of the process of generating marker reference data are described with reference to FIG. 7. Note that marker reference data is one example of marker reference information including relative position information, which is positional information with reference to any marker.

In the marker reference data generation process, with control by control unit 13, the above-described marker detection process P1 is periodically performed. Control unit 13 controls sensor array 21 so that marker detection process P1 is performed at the frequency of 3 kHz so as to support generation and recording point cloud data during traveling of data collection vehicle 5 as described above. Note that in this marker detection process P1, a lateral shift amount (one example of relative position information) of data collection vehicle 5 with respect to detected magnetic marker 10 is measured.

If any magnetic marker 10 has been detected (S101: YES), with control by control unit 13, tag reader 34 performs tag ID read process P2. Control unit 13 generates marker reference data including the tag ID read in tag ID read process P2, which is one example of a unique information acquiring process, and the lateral shift amount measured in marker detection process P1 (relative position information) (S102). Marker reference data generated as described above is written in a predetermined write area to be rewritten to the latest as occasion arises (S103).

On the other hand, if any magnetic marker 10 is not detected (S101: NO), control unit 13 utilizes the relative position estimated by IMU 22 with reference to the own vehicle position at the time of the previous detection of any magnetic marker, and performs a process of estimating a relative position of the own vehicle with reference to that magnetic marker (S112).

Specifically, based on the lateral shift amount measured at the time of the previous detection of any magnetic marker and the relative position estimated by IMU 22, control unit 13 estimates a relative position of the own vehicle with respect to the magnetic marker previously detected. The relative position of the own vehicle with reference to the magnetic marker previously detected is identified by the sum of a vector of the lateral shift amount in the vehicle-width direction at the time of the previous detection of any magnetic marker and a vector representing a relative position (relative position estimated by IMU 22) with reference to the own vehicle position at the time of the previous detection of any magnetic marker.

Then, control unit 13 generates marker reference data including data of the relative position estimated at step S112 (relative position information) and the tag ID read in immediately-previous tag ID read process P2 (S102). Then, generated marker reference data is written in a predetermined write area, and is rewritten to the latest as occasion arises (S103). Note that the tag ID read in tag ID read process P2 is retained as it is until overwritten by execution of new tag ID read process P2.

(3) Point Cloud Data Generation Process

Figure 8:
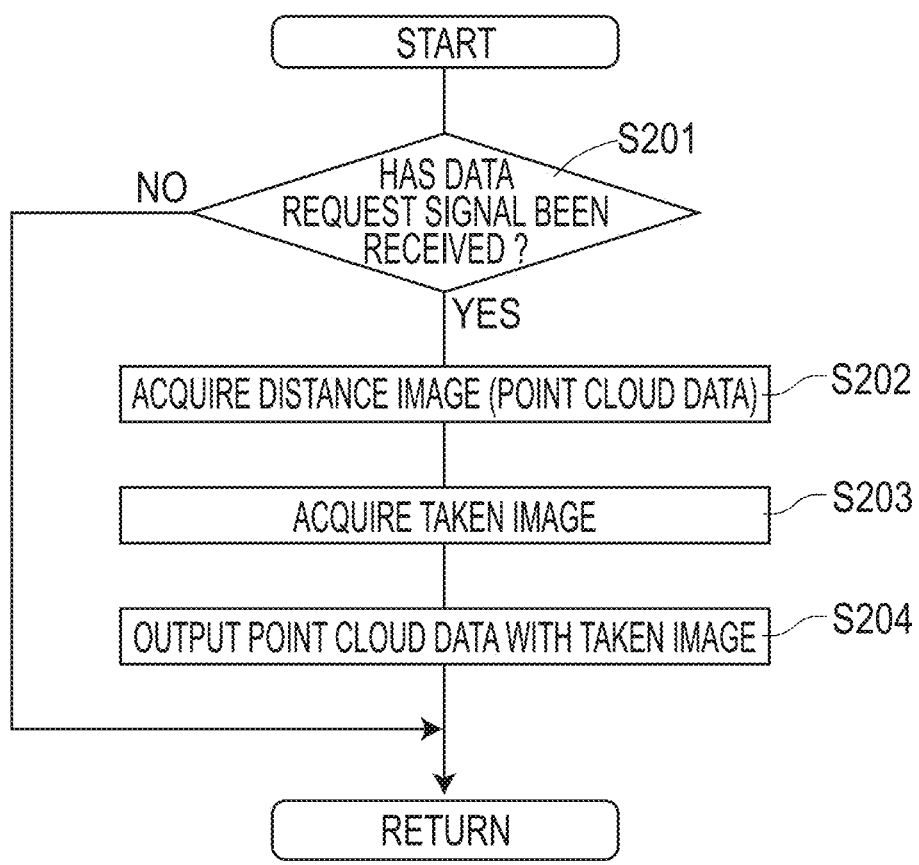
FIG. 8 is a flow diagram depicting a flow of a point cloud data generation process in the first embodiment.

A flow of the point cloud data generation process is described with reference to a flow diagram of FIG. 8. Upon receiving a point cloud data request signal (will be described further below) from control unit 13 (S201: YES), point cloud data generation unit 3 (FIG. 4) controls range finding part 31 to acquire the distance image, which is point cloud data (S202). Also, point cloud data generation unit 3 controls camera 33 to acquire a front taken image (S203). Then, point cloud data generation unit 3 outputs point cloud data (distance image) together with the taken image (S204).

(4) Data Recording Process

Figure 9:
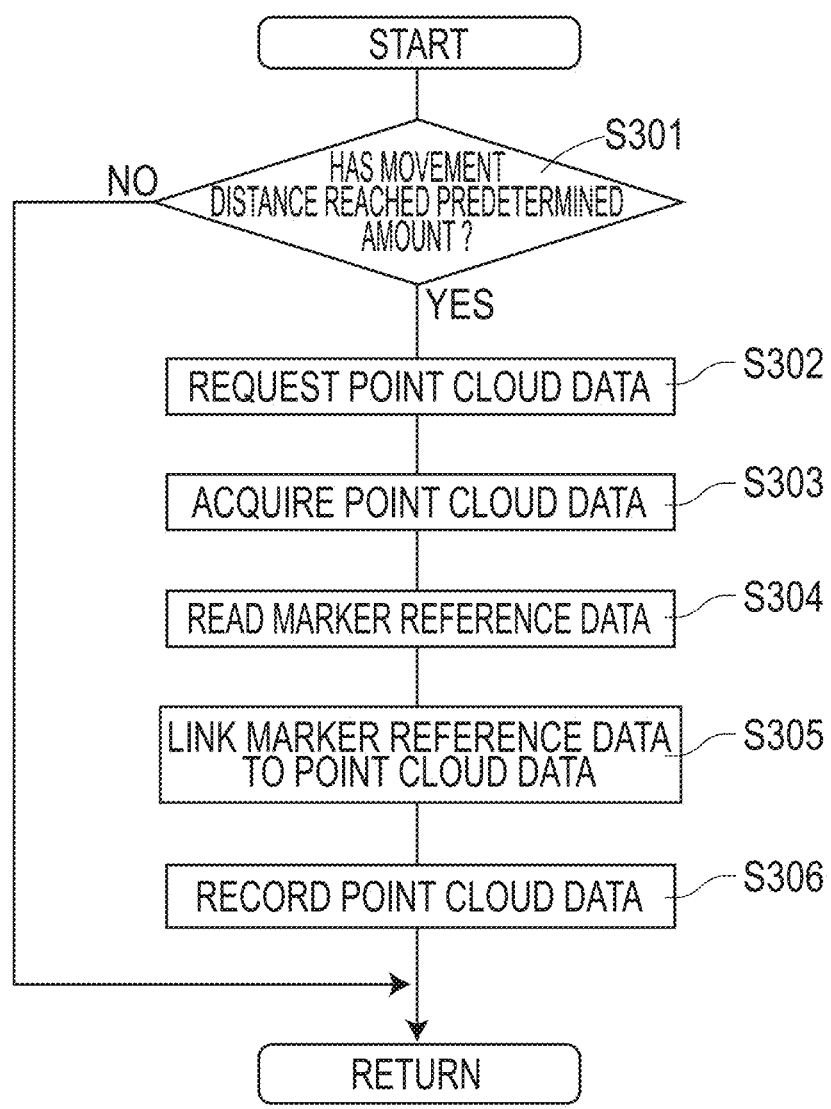
FIG. 9 is a flow diagram depicting a flow of a data recording process in the first embodiment.

Details of the data recording process are described with reference to a flow diagram of FIG. 9. Every time the movement distance of data collection vehicle 5 reaches a predetermined amount (S301: YES), control unit 13 outputs a point cloud data request signal toward point cloud data generation unit 3 (S302). Note that the present embodiment is an example in which 10 centimeters is set as a predetermined amount. According to the determination at the above-described step S301, point cloud data for every constant distance such as, for example, 10 centimeters, can be acquired.

Upon receiving point cloud data (S303), control unit 13 performs reading of the above-described marker reference data (S304). Here, as described above, marker detection process P1 of generating marker reference data is performed at the frequency of 3 kHz. This frequency of 3 kHz is sufficiently fast with respect to the frequency for acquiring point cloud data. Therefore, the point of time of generation of marker reference data read at the above-described step S304 can be regarded as the same as the point of time of generation of point cloud data acquired at step S303.

Control unit 13 performs a process of linking point cloud data acquired at step S303 to marker reference data read at step S304 (S305). Then, control unit 13 records that point cloud data with marker reference data linked thereto into point cloud DB 133 (S306). Note that marker reference data to be linked to point cloud data includes at least the tag ID (marker identification information) of magnetic marker 10 immediately-previously detected and data of the relative position with respect to that magnetic marker 10.

At the time of recording point cloud data representing the traveling environment, mobile mapping system 1 as configured above links marker reference data including the data of the relative position with reference to the position of magnetic marker 10 to point cloud data. According to this marker reference data, the position of data collection vehicle 5 when point cloud data is acquired, that is, the acquisition position of point cloud data, can be identified with high accuracy. Point cloud data with its acquisition position identified with high accuracy serves as base data effective in creating a high-accuracy three-dimensional map.

Note that when the acquisition position of point cloud data is identified at the time of creating a three-dimensional map, it is preferable to utilize a marker database (marker DB), in which the tag ID, which is marker identification information, and the data of the laying position (absolute position) of magnetic marker 10 corresponding thereto are linked to each other. Marker reference data linked to point cloud data includes the tag ID, which is marker identification information of magnetic marker 10 which serves as a reference. By referring to the above-described marker DB utilizing this tag ID, the absolute position of magnetic marker 10 which serves as a reference can be acquired. Furthermore, marker reference data includes the data of the relative position with respect to magnetic marker 10 which serves as a reference. By taking the absolute position of magnetic marker 10 as a reference, utilizing the data of the relative position in marker reference data, the acquisition position (absolute position) of point cloud data can be identified with high accuracy. Note that on the precondition that data collection vehicle 5 is traveling along the lane, the center direction of point cloud data can be treated as matching the lane direction.

Note that in the present embodiment, marker reference data including the tag ID, which is unique information of magnetic marker 10, is exemplarily described. In place of or in addition to this, marker reference data may include the laying position of magnetic marker 10. In this case, the laying position of magnetic marker 10 is one example of the unique information of magnetic marker 10. Here, marker reference data is preferably a combination of the laying position and the data of the relative position of magnetic marker 10. For example, if control unit 13 of data collection vehicle 5 can refer to a marker DB similar to the above, the laying position of magnetic marker 10 corresponding to the tag ID can be acquired by utilizing the tag ID. Alternatively, RFID tag 15 which transmits position data representing the laying position of magnetic marker 10 may be adopted.

Data of the vehicle position (position of data collection vehicle 5) identified with reference to magnetic marker 10 may be adopted as marker reference data and linked to point cloud data. The vehicle position can be identified as a position acquired by shifting the laying position of magnetic marker 10 as a reference by a relative position such as a lateral shift amount. The vehicle position is processed information acquired by subjecting the data of the relative position with reference to magnetic marker 10 to a calculation process. Information of this vehicle position is one example of information based on positional information with reference to magnetic marker 10.

In the present embodiment, as one example of point cloud data, the distance image by range finding part 31 utilizing laser light is exemplarily described. As range finding part 31, there are a range finding part which utilizes radio waves such as millimeter waves, a range finding part which measures a distance by utilizing parallax based on stereoscopy, and so forth. Any of these range finding parts may be adopted, and a plurality of these may also be combined.

While magnetic marker 10 is exemplarily described as a marker in the present embodiment, this can be replaced by any of various markers disposed on road 11. For example, the marker may be printed on road surface 11S, or the marker may be one such as a cat's eye.

According to mobile mapping system 1 of the present embodiment configured as described above, data collection vehicle 5 can efficiently acquire high-accuracy point cloud data while traveling on road 11. And, with point cloud data efficiently acquired, cost of creating a three-dimensional map can be suppressed.

Here, points in which the magnetic marker as a marker is excellent are described. Utilizing the magnetic marker is advantageous in reading accuracy and reading reliability, compared with, for example, the marker printed on the road surface, the marker such as a cat's eye, and so forth. For example, the marker such as a cat's eye is often provided on a lane mark, which is a division line of the lane. In the case of the cat's eye provided on the lane mark, since the cat's eye is positioned away from the vehicle in the vehicle-width direction, there is a possibility that reliability of detection is not sufficient or accuracy of measurement of a distance between the cat's eye and the vehicle is not sufficiently ensured. On the other hand, in the case of the magnetic marker arranged at the center of the lane or the like, since the magnetic marker is positioned directly below the vehicle, detection is relatively easy and accuracy of measurement of the position of the vehicle facing the magnetic marker is relatively easily ensured. Also, the magnetic marker which externally generates magnetism can be detected on a vehicle side even if snow, soil, or the like is attached. On the other hand, for the marker such as a cat's eye, the degree of difficulty of detection greatly increases with attachment of snow, soil, or the like.

Furthermore, the magnetic marker is more advantageous than a radio marker which wirelessly outputs radio waves in accuracy of the position measurable on the vehicle side. For example, when the vehicle passes over the magnetic marker, the acting direction of magnetism along the longitudinal direction corresponding to the forwarding direction of the vehicle is reversed, causing the signs of the magnetic measurement values by the magnetic sensor to be reversed. Also, the acting direction of magnetism along the lateral direction corresponding to the vehicle-width direction of the vehicle is reversed on the left and right of the magnetic marker. Thus, depending on whether the magnetic sensor is present on the left or right of the magnetic marker, the sign of the magnetic measurement value by the magnetic sensor is different. For example, by utilizing reversal of the acting direction of magnetism by taking the magnetic marker as a center, the magnetic marker can be detected with high position accuracy. By contrast, while the radio marker is detectable in a relatively wide range where radio waves can reach, it is difficult to identify the position with high accuracy.

Second Embodiment

The present embodiment is an example of mobile mapping system 1 in which, based on the mobile mapping system of the first embodiment, information regarding a reference azimuth representing the center direction of point cloud data is added to marker reference information. Details of this are described with reference to FIG. 1 and FIG. 10 to FIG. 15.

Mobile mapping system 1 of the present embodiment assumes a road with magnetic markers 10 arranged every 2 meters (marker span S=2 meters) along the center of the lane. In this mobile mapping system 1, the reference azimuth of point cloud data is estimated by utilizing two magnetic markers 10. Note that in the present embodiment, the center axis of range finding part 31 is exemplarily described as the reference azimuth representing the center direction of point cloud data.

The control unit (reference sign 13 in FIG. 1) of the present embodiment has a function as an azimuth estimating part which estimates the azimuth (longitudinal direction, orientation, azimuth of the center axis of the vehicle body) of data collection vehicle 5. The control unit as an azimuth estimating part estimates an azimuth shift angle, which is a deviation of the azimuth (orientation of the vehicle body) of data collection vehicle 5 with respect to the lane direction, by utilizing adjacent two magnetic markers 10 (azimuth estimation process).

In the configuration of the present embodiment, adjustment is made so that the azimuth of data collection vehicle 5 matches the center axis of range finding part 31 which acquires point cloud data, and the relation therebetween is known. Therefore, if the azimuth of data collection vehicle 5 can be grasped, the reference azimuth of point cloud data can be identified. In particular, in the case of the configuration of the present embodiment in which adjustment is made so that the center axis of range finding part 31 matches the center axis of data collection vehicle 5, the azimuth of data collection vehicle 5 directly becomes the reference azimuth representing the center direction of point cloud data.

Figure 10:
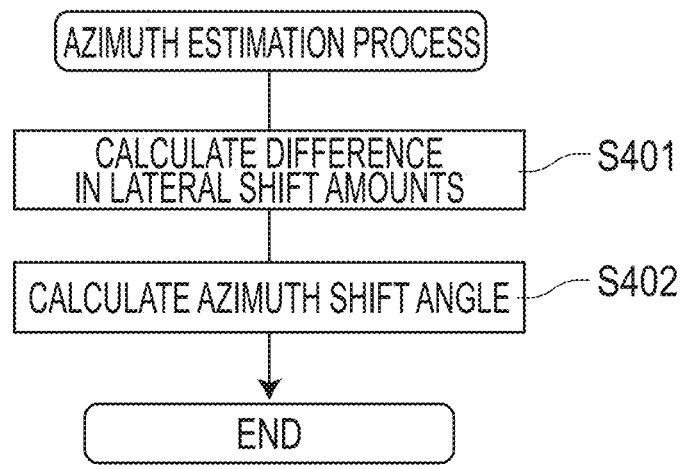
FIG. 10 is a flow diagram depicting a flow of an azimuth estimation process in a second embodiment.

To estimate the azimuth of data collection vehicle 5, control unit 13 performs azimuth estimation process of FIG. 10. This azimuth estimation process is a process including a step of calculating a difference between lateral shift amounts with respect to two magnetic markers 10 (S401) and a step of calculating azimuth shift angle Rf, which is a deviation in the forwarding direction with respect to line-segment direction Mx (refer to FIG. 11) connecting the positions of two magnetic markers 10 (S402). Here, two magnetic markers 10 are laid along the center of the lane. Therefore, line-segment direction Mx connecting the positions of adjacent two magnetic markers 10 substantially matches the lane direction (direction of the road).

Figure 11:
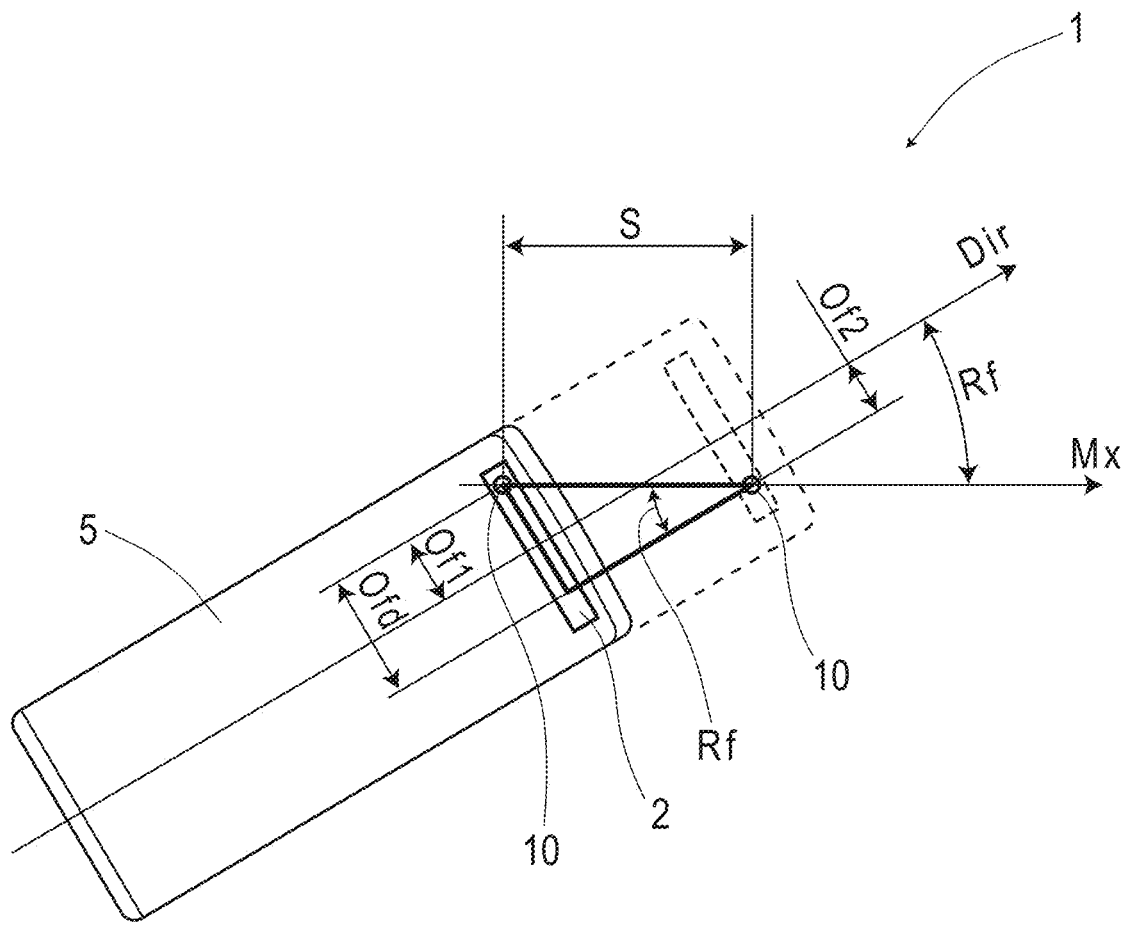
FIG. 11 is a descriptive diagram depicting a relation between difference Ofd in lateral shift amount and azimuth shift angle Rf at the time of passing over two magnetic markers in the second embodiment.
Figure 12:
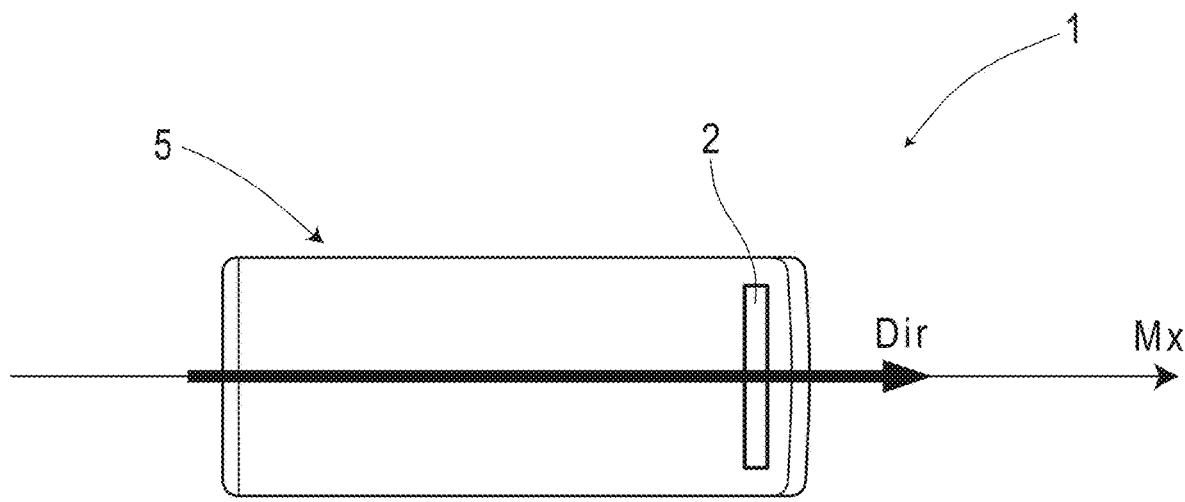
FIG. 12 is a descriptive diagram exemplarily depicting a situation in which a vehicle travels along a straight road in the second embodiment.
Figure 13:
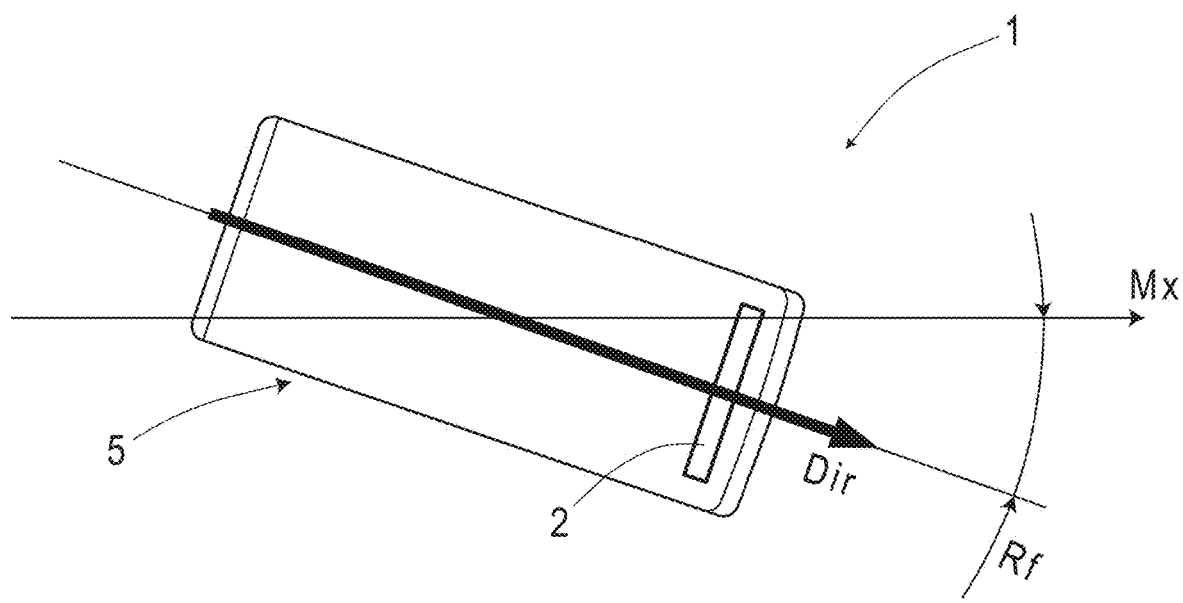
FIG. 13 is a descriptive diagram exemplarily depicting a situation in which the vehicle diagonally travels on the straight road in the second embodiment.
Figure 14:
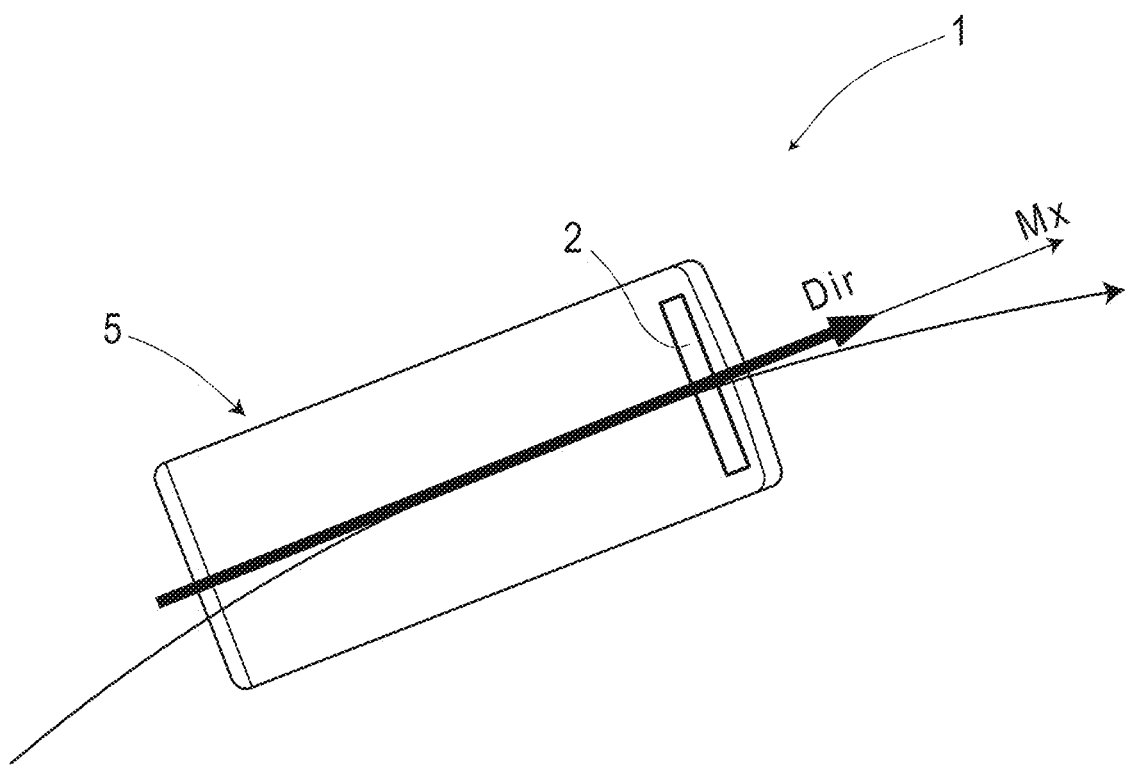
FIG. 14 is a descriptive diagram exemplarily depicting a situation in which the vehicle travels along a curved road in the second embodiment.
Figure 15:
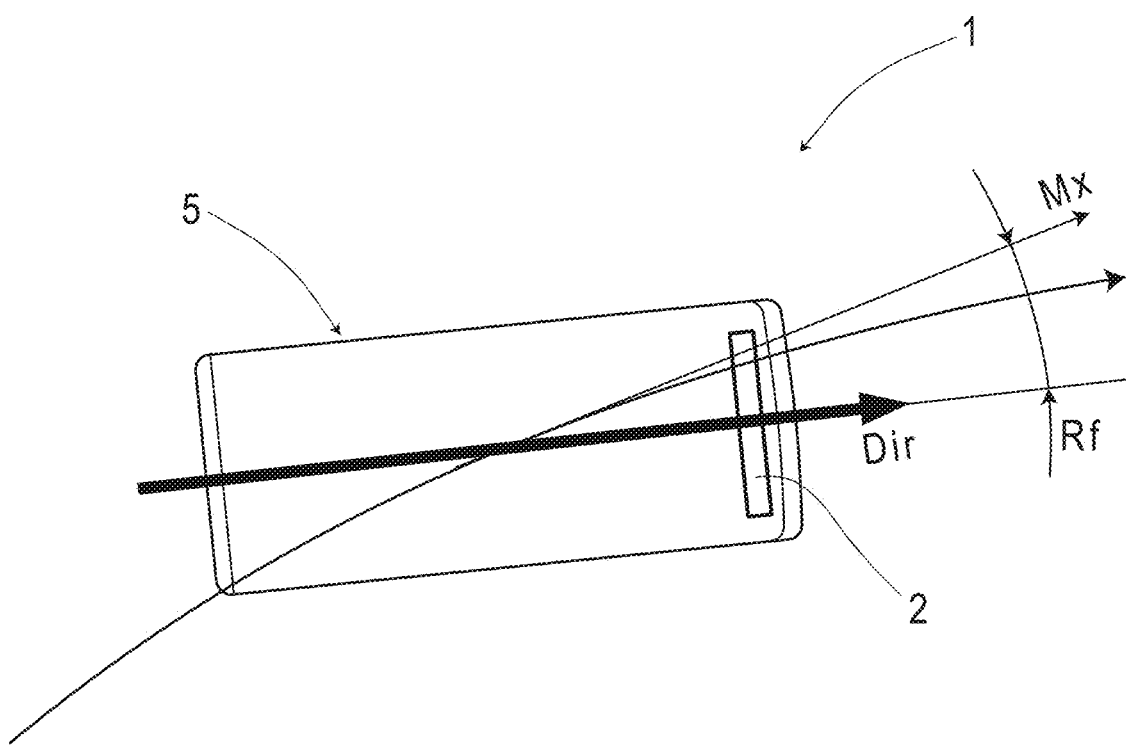
FIG. 15 is a descriptive diagram exemplarily depicting a situation in which the vehicle diagonally travels on the curved road in the second embodiment.

At step S401, as in FIG. 11, when data collection vehicle 5 passes over adjacent two magnetic markers 10, difference Ofd between lateral shift amount Of1 with respect to first magnetic marker 10 and lateral shift amount Of2 with respect to second magnetic marker 10 is calculated by the following equation. Note that in the case of the diagram, since the signs of Of1 and Of2 are different, in accordance with the difference, the absolute value of Ofd has a value exceeding the absolute values of Of1 and Of2. Note that in FIG. 11, control unit 13 and so forth are not depicted.

$$Ofd=(Of1-Of2) \quad \text{[Equation 1]}$$

At following step S402, as in FIG. 11, azimuth shift angle Rf is calculated, which is an angle (angular deviation in a turning direction) formed by azimuth Dir of data collection vehicle 5 with respect to line-segment direction Mx (matching the lane direction) connecting the positions of two magnetic markers 10. This azimuth shift angle Rf is calculated by the following equation including difference Ofd in lateral shift amount and marker span S.

$$Rf=\arcsin(Ofd/S) \quad \text{[Equation 2]}$$

For example, when data collection vehicle 5 is traveling along a straight road (FIG. 12), the orientation of data collection vehicle 5 is along the lane direction. In this case, azimuth shift angle Rf, which is an angle formed by azimuth Dir of data collection vehicle 5 with respect to line-segment direction Mx connecting the positions of two magnetic markers 10, becomes close to zero. On the other hand, when the orientation of data collection vehicle 5 is not along the lane direction (FIG. 13), azimuth Dir of data collection vehicle 5 is shifted with respect to line-segment direction Mx to increase azimuth shift angle Rf.

For example, when vehicle 5 is traveling along a curved road (FIG. 14), line-segment direction Mx connecting the positions of two magnetic markers 10 matches the tangential direction of the lane as a curved road, and azimuth shift angle Rf, which is an angle formed by azimuth Dir of data collection vehicle 5 with respect to this line-segment direction Mx becomes zero. On the other hand, at the time of diagonally traveling on the lane as a curved road (FIG. 15), the shift of azimuth Dir of data collection vehicle 5 with respect to the tangential direction of the lane as a curved road increases to increase azimuth shift angle Rf.

As described above, the center axis of range finding part 31 which acquires point cloud data serves as a reference azimuth representing the center of point cloud data to be acquired by range finding part 31. Also, in the configuration of the present embodiment, the center axis of range finding part 31 substantially matches azimuth Dir of data collection vehicle 5. Therefore, azimuth shift angle Rf representing an azimuth shift of data collection vehicle 5 with respect to line-segment direction Mx corresponds to an azimuth shift of the reference azimuth of point cloud data with respect to line-segment direction Mx described above corresponding to the lane direction.

Control unit 13 as a data recording part links, to point cloud data, marker reference data including azimuth shift angle Rf (one example of information representing the reference azimuth of point cloud data), which is an azimuth shift of the reference azimuth of point cloud data with respect to the lane direction. Based on azimuth shift angle Rf, the azimuth of each point indicated by point cloud data with reference to lane direction Mx can be identified with high accuracy by calculation or the like. Point cloud data with the azimuth of each point identified with high accuracy is very useful in creating a high-accuracy three-dimensional map.

When data collection vehicle 5 records point cloud data as traveling along the lane, if the azimuth (orientation) of data collection vehicle 5 completely matches the lane direction, the relation (such as an azimuth difference) between the lane direction and the reference azimuth of point cloud data is constant. However, in actual traveling of data collection vehicle 5, slight meandering of a traveling path is unavoidable, and thus the azimuth of data collection vehicle 5 may be shifted from the lane direction. And, when the azimuth of data collection vehicle 5 is shifted from the lane direction, the relation between the reference azimuth of point cloud data and the lane direction becomes unstable.

By contrast, according to marker reference information including the information representing the reference azimuth of point cloud data in the present embodiment, the relation between the reference azimuth of point cloud data and line-segment direction Mx can be identified with high accuracy. If the relative relation of the reference azimuth of point cloud data with respect to line-segment direction Mx can be identified, a deviation of the azimuth of data collection vehicle 5 from the lane direction (substantially matching line-segment direction Mx) is allowable. According to point cloud data, to which marker reference data including information of the reference azimuth of point cloud data described above is linked, even if data collection vehicle 5 meanders during data collection, it is possible to create a high-accuracy three-dimensional map.

Note that data collection vehicle 5 may be provided with the marker DB with the tag ID, which is unique information of magnetic marker 10, and data of the laying position (absolute position) of magnetic marker 10 corresponding thereto linked to each other. In this case, control unit 13 can calculate an absolute azimuth of line-segment direction Mx connecting the positions of two magnetic markers 10. And, if the absolute azimuth of line-segment direction Mx can be grasped, the absolute azimuth of each point of point cloud data can be calculated by utilizing azimuth shift angle Rf. In this case, the absolute reference azimuth of point cloud data can be included in marker reference data.

Note that in the present embodiment, the center direction corresponding to the center axis of range finding part 31 is exemplarily described as the reference azimuth of point cloud data. The reference azimuth of point cloud data may be any azimuth serving as a reference, and the center direction is not an imperative requirement.

The match between the vehicle azimuth and the reference azimuth of point cloud data is not imperative. Also, a plurality of range finding part with different center axis directions may be provided.

Other configurations and operations and effects are similar to those of the first embodiment.

Third Embodiment

The present embodiment is one example of mobile mapping system 1 which acquires, based on the mobile mapping system of the second embodiment, azimuth shift angle Rf by utilizing sensor units 2 provided at the front and rear of data collection vehicle 5. Details of this are described with reference to FIG. 16.

In data collection vehicle 5 of the present embodiment, sensor units 2 are arranged with a pitch of 4 meters. 4 meters, which is a pitch between front and rear sensor units 2, is equal to the pitch of 4 meters (taken as marker span S1) between two magnetic markers 10 with one interposed therebetween. According to sensor units 2 arranged at the pitch of 4 meters, adjacent two magnetic markers 10 with one magnetic marker 10 interposed therebetween can be detected at approximately the same timing.

Figure 16:
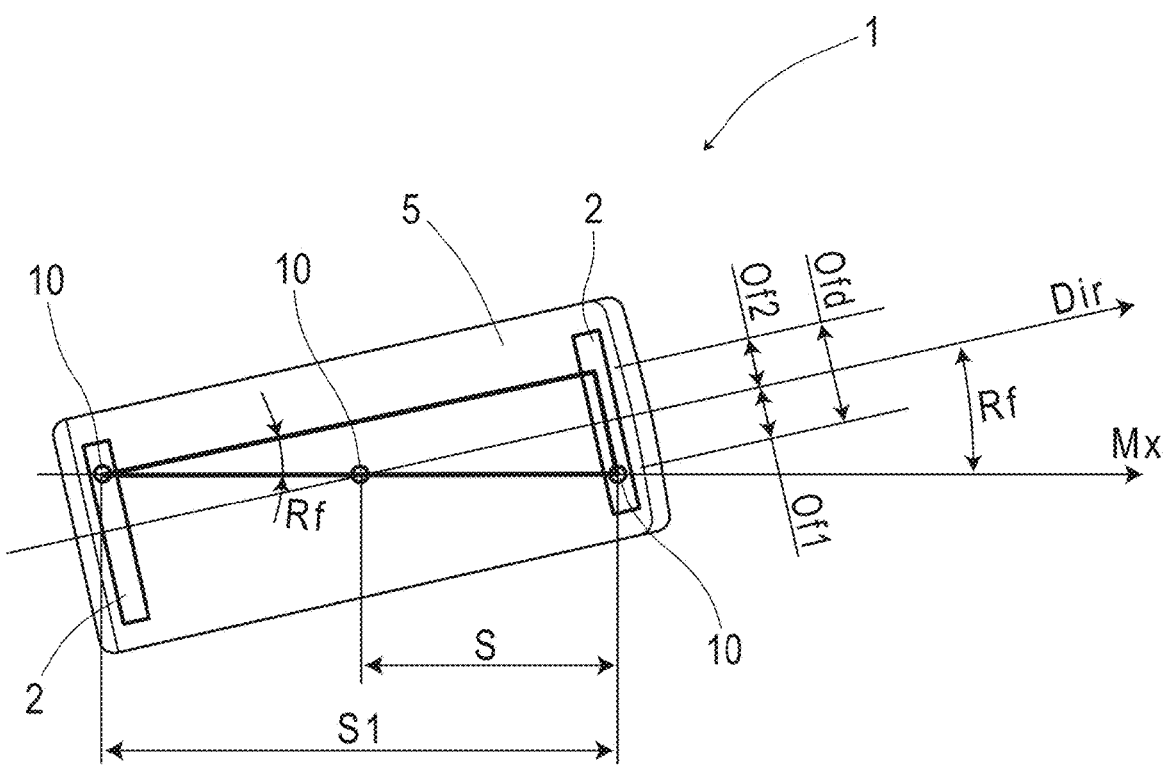
FIG. 16 is a descriptive diagram depicting a relation between difference Ofd in lateral shift amount and azimuth shift angle Rf with respect to two magnetic markers in a third embodiment.

As in FIG. 16, when a lateral shift amount measured by front-side sensor unit 2 is taken as Of1, a lateral shift amount measured by rear-side sensor unit is taken as Of2, and a difference therebetween is taken as Ofd, azimuth shift angle Rf can be calculated by the following equation.

$$Rf = \arcsin(Ofd/S1) \qquad \text{[Equation 3]}$$

Note that a sensor unit may be additionally arranged at the center between front and rear sensor units 2 at the pitch of 4 meters. In this case, at least either one of a combination of front-side sensor unit 2 and a center sensor unit and a combination of rear-side sensor unit 2 and the center sensor unit can detect adjacent magnetic markers 10 at a pitch of 2 meters at the same timing to measure a lateral shift amount. In accordance with the speed, switching may be made between utilizing two magnetic markers 10 at the pitch of 2 meters and utilizing two magnetic markers 10 at the pitch of 4 meters.

Note that other configurations and operations and effects are similar to those of the second embodiment.

In the foregoing, specific examples of the present invention are described in detail as in the embodiments, these specific examples merely disclose examples of technology included in the scope of the claims. Needless to say, the scope of the claims should not be restrictively construed based on the configuration, numerical values, and so forth of the specific examples. The scope of the claims includes technologies acquired by variously modifying, changing, or combining as appropriate the above-described specific examples by using known technologies, knowledge of a person skilled in the art, and so forth.

REFERENCE SIGNS LIST 1 mobile mapping system (point cloud data acquiring system)
10 magnetic marker (marker)
11 road (traveling road)
11S road surface
13 control unit (data recording part, azimuth estimating part)
130 data recording part
133 point cloud DB (point cloud database)
15 RFID tag (information providing part)
2 sensor unit (marker detecting part)
21 sensor array
22 IMU
3 point cloud data generating unit
31 range finding part
33 camera
34 tag reader (information reading part)
5 data collection vehicle

The invention claimed is:

1. A point cloud data acquiring method, comprising:
measuring, using a ranging sensor, a plurality of azimuths and distances from the ranging sensor to a plurality of planimetric features configuring a traveling environment of a vehicle of the point cloud data acquiring system, and acquiring point cloud data representing the plurality of azimuths and distances;
detecting, using a magnetic sensor, a plurality of magnetic markers laid in or on a traveling road of the vehicle, each of the plurality of magnetic markers being a magnetism generation source;

reading, using an RFID (Radio Frequency IDentification) tag reader, from a plurality of RFID tags, unique information of each of the plurality of magnetic markers, each of the plurality of RFID tags being attached to each of the plurality of magnetic markers, each of the plurality of RFID tags being configured to provide the unique information of a magnetic marker of the plurality of magnetic markers to which the RFID tag is attached; and recording, using processing circuitry, in a memory, the point cloud data by linking each data representing azimuth and distance of the plurality of azimuths and distances with (1) marker reference information including the unique information of each of the plurality of magnetic markers, and (2) relative position information representing a relative position of the vehicle with reference to each of the plurality of magnetic markers.

2. The point cloud data acquiring method in claim 1, further comprising:

estimating a reference azimuth of the point cloud data by utilizing at least two of the plurality of magnetic markers, wherein the marker reference information includes information representing the reference azimuth estimated in the estimating.

3. A point cloud data acquiring system, comprising:

a ranging sensor configured to measure a plurality of azimuths and distances from the ranging sensor to a plurality of planimetric features configuring a traveling environment of a vehicle of the point cloud data acquiring system, and acquire point cloud data representing the plurality of azimuths and distances;

a plurality of magnetic markers laid in a traveling road of the vehicle, each of the plurality of magnetic markers being a magnetism generation source;

a magnetic sensor configured to detect the plurality of magnetic markers;

a plurality of RFID (Radio Frequency IDentification) tags, each of the plurality of RFID tags being attached to each of the plurality of magnetic markers, each of the plurality of RFID tags being configured to provide unique information of a magnetic marker of the plurality of magnetic markers to which the RFID tag is attached;

an RFID tag reader configured to read, from the plurality of RFID tags, the unique information of each of the plurality of magnetic markers; and processing circuitry configured to record, in a memory, the point cloud data by linking each data representing azimuth and distance of the plurality of azimuths and distances with (1) marker reference information including the unique information of any marker and each of the plurality of magnetic markers, and (2) relative position information representing a relative position of the vehicle with reference to each of the plurality of magnetic markers.

4. The point cloud data acquiring system in claim 3, wherein the processing circuitry is configured to estimate a reference azimuth of the point cloud data by utilizing at least two of the plurality of magnetic markers, wherein the marker reference information includes information representing the reference azimuth estimated by the processing circuitry.

5. The point cloud data acquiring method in claim 1, wherein the unique information is identification information of each of the plurality of magnetic markers.

6. The point cloud data acquiring method in claim 3, wherein the unique information is identification information of each of the plurality of magnetic markers.

7. The point cloud data acquiring method in claim 2, wherein the unique information is identification information of each of the plurality of magnetic markers.

8. The point cloud data acquiring system in claim 4, wherein the unique information is identification information of each of the plurality of magnetic markers.

9. The point cloud data acquiring system in claim 3, wherein the marker reference information includes a laying position of the plurality of magnetic markers.

10. The point cloud data acquiring system in claim 3, wherein the marker reference information includes data of a vehicle position of the vehicle identified with reference to one of the plurality of magnetic markers.

11. The point cloud data acquiring system in claim 4, wherein the magnetic sensor includes front and rear magnetic sensors, a pitch between the front and rear magnetic sensors is equal to a pitch between each adjacent magnetic markers of the plurality of magnetic markers, and the processing circuitry is configured to calculate an azimuth shift angle of the vehicle based on two lateral shift amounts of the vehicle measured by the front and rear magnetic sensors.

12. The point cloud data acquiring system in claim 11, wherein the magnetic sensor further includes a center magnetic sensor, and the processing circuitry is configured to switch whether the center magnetic sensor unit is utilized or not in accordance with a speed of the vehicle.

13. The point cloud data acquiring method in claim 1, wherein the marker reference information includes a plurality of laying positions of the plurality of magnetic markers.

14. The point cloud data acquiring method in claim 1, wherein the marker reference information includes data of a vehicle position of the vehicle identified with reference to one of the plurality of magnetic markers.

15. The point cloud data acquiring method in claim 2, wherein the magnetic sensor includes front and rear magnetic sensors, a pitch between the front and rear magnetic sensors is equal to a pitch between each adjacent magnetic markers of the plurality of magnetic markers, and the method further comprises calculating an azimuth shift angle of the vehicle based on two lateral shift amounts of the vehicle measured by the front and rear magnetic sensors.

16. The point cloud data acquiring method in claim 15, wherein the magnetic sensor further includes a center magnetic sensor, and the method further comprises switching whether the center magnetic sensor unit is utilized or not in accordance with a speed of the vehicle.

* * * * *